(No Model.)

W. HODGE & J. PEARSON.
SPLIT LINK CENTER PIN HOOK.

No. 525,210. Patented Aug. 28, 1894.

United States Patent Office.

WILLIAM HODGE AND JOHN PEARSON, OF TIMARU, NEW ZEALAND.

SPLIT-LINK CENTER-PIN HOOK.

SPECIFICATION forming part of Letters Patent No. 525,210, dated August 28, 1894.

Application filed July 13, 1893. Serial No. 480,427. (No model.) Patented in England July 20, 1893, No. 14,088.

*To all whom it may concern:*

Be it known that we, WILLIAM HODGE and JOHN PEARSON, subjects of the Queen of Great Britain and Ireland, residing at Timaru, in the Colony of New Zealand, have invented a certain new and useful Split-Link Center-Pin Hook, for which we have obtained Letters Patent of Great Britain, No. 14,088, dated July 20, 1893, of which the following is a specification.

This invention relates to a very simple and effective "split-link center-pin hook" which we have designed with the object of supplying a long felt want namely, an easily adjustable and practically unbreakable hook for harness or for general use.

In carrying our invention into effect, we construct a link of two counter parts, each part having a central collar extending one-half the width of the link, so that when the parts are united or properly placed together, the said collars coincide or meet in such manner as to form a central bearing for a pin passing through the collars and forming an axis upon which the parts are capable of being turned in opposite directions. Preferably we form one end of each part of the link with an eye, which when the parts are closed are held from being opened or spread apart by means of a pin passing through the eyes, substantially as will hereinafter more fully appear.

Our split-link center-pin hooks may be constructed of malleable iron, steel, or other suitable metal and may be made in various forms to suit different requirements.

Figure 1:
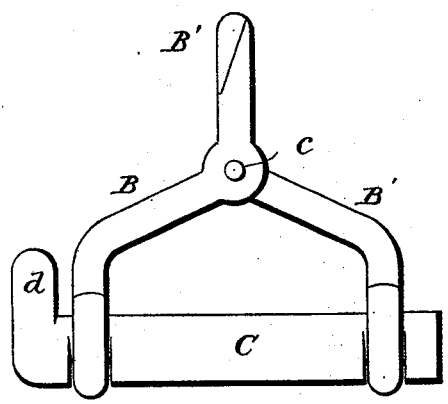
Figure 2:
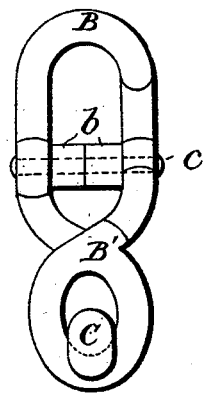
Figure 3:
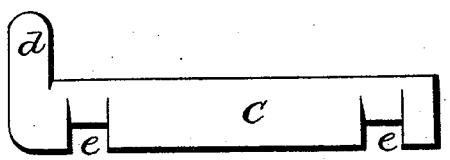
Figure 4:

Referring to the drawings which form a part of this specification, Figure 1, is a side view of a split link center pin hook embodying our preferred construction, and being more particularly intended for use in connection with ordinary harness, such view clearly indicating the general construction and arrangement of the said device. Fig. 2, is a side view of the same. Fig. 3, is a side view of the slotted pin detached, and Fig. 4, is a section of such pin, taken through one of its slots or notches.

Referring to the several figures of the drawings, B B' are the two parts of the split-link each having a collar $b$ through which the center pin $c$ is passed and riveted as shown. This represents the preferred form of our invention. One end of each part of link in the present instance is formed into an eye as shown, through which the pin C is passed; this pin has a lip or lug $d$ at one end and two slots $e$, $e$, on one side into which the said eyes fit, thereby keeping the other ends of the link closed. By turning the lip or lug $d$ the slots $e$, $e$, release the eyes and enables the pin C to be drawn out and the other end of link opened.

We desire it to be understood that we do not confine ourselves to the precise form, or shape, of the split-link center-pin hook as shown in the annexed drawings, as they may be made of various shapes without departing from the nature and object of our invention.

Having now described our invention, what we claim as new, and desire to secure by Letters Patent, is—

1. A split link center pin hook, embodying two counter-part sections pivoted together centrally and closing up to form an eye between them, each section being extended outwardly and formed or provided separately with an independent eye, substantially as shown and for the purpose set forth.

2. A split link constructed of two counter-part sections, centrally joined or pivoted together, each part being formed or provided with an eye and a locking pin passing through the eyes, and constructed with notches into which the parts of the link are received, substantially as described.

In testimony whereof we have signed our names to this specification in presence of two witnesses.

WILLIAM HODGE.
JOHN PEARSON.

Witnesses:
S. F. SMITHSON,
*Solicitor, Timaru, N. Z.*
JAMES FRANGER,
*Accountant, Timaru, N. Zealand.*